Patented Aug. 9, 1938

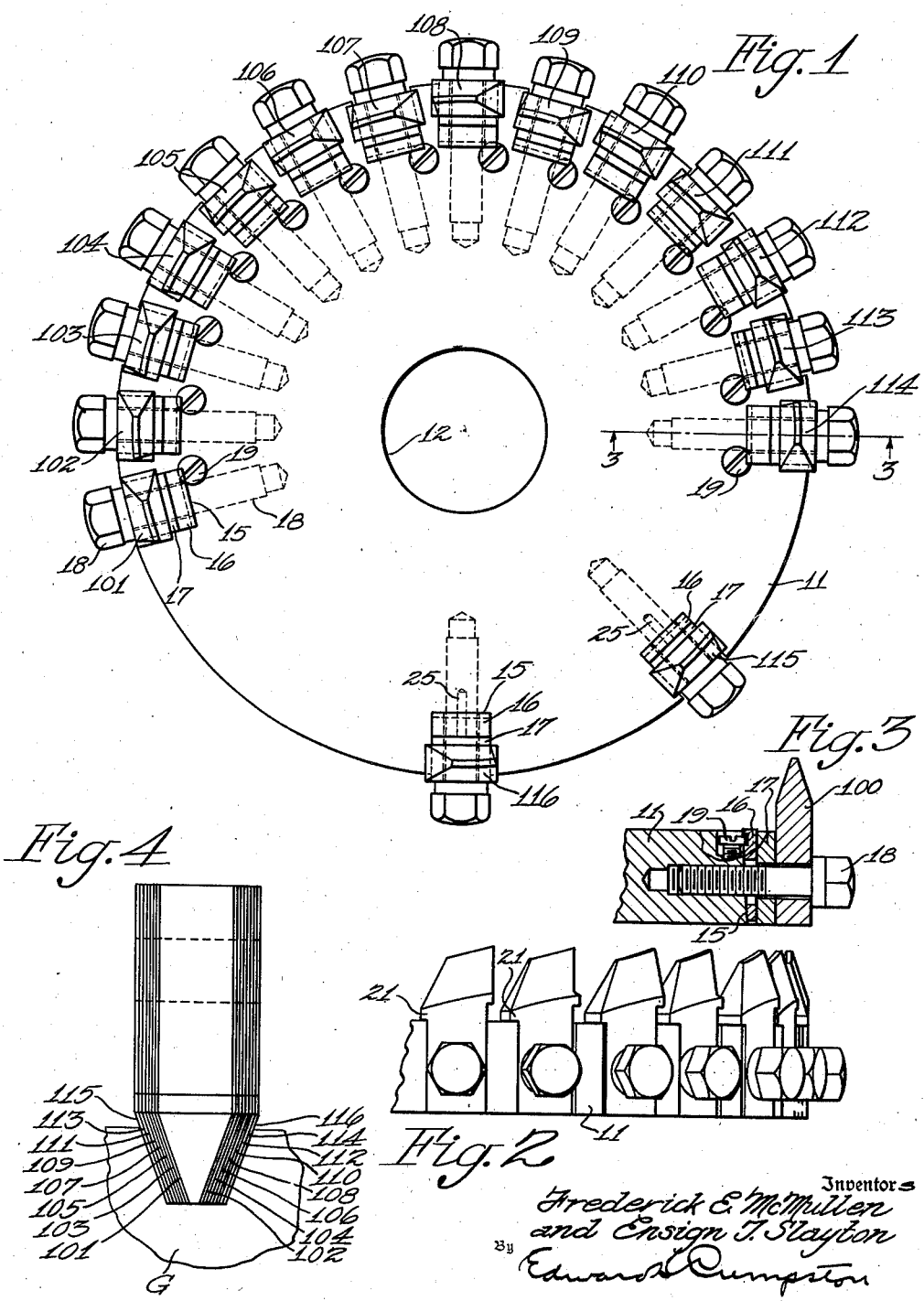

2,125,943

UNITED STATES PATENT OFFICE 2,125,943

CUTTER FOR CUTTING GEARS

Frederick E. McMullen and Ensign T. Slayton, Rochester, N. Y., assignors to Gleason Works, Rochester, N. Y., a corporation of New York Application March 30, 1936, Serial No. 71,588

11 Claims. (Cl. 29—105)

The present invention deals with a method of cutting gears and with a cutter for cutting gears according to the method.

An object of the invention is the provision of a simplified, effective, and improved method of cutting gears, and particularly spiral bevel gears and hypoid gears, although the method is not confined to the cutting of gears of this type.

Another object of the invention is the provision of a simple and efficient cutter for cutting gears, and especially the provision of such a cutter which is particularly adapted and suitable for cutting spiral bevel gears and hypoid gears, although not confined in its usefulness to gears of this type.

Still another object is the provision of a cutter which is simple and relatively inexpensive to construct, which is easy to maintain in efficient operating condition, and which will cut gear teeth more accurately than the cutters heretofore employed.

A further object is the provision of a gear cutter so designed and constructed that it enables the elimination of some of the motions heretofore commonly used in gear cutting machines, with the result that the gear cutting machine may be simplified and made more firm and rigid, with consequent improvement in the quality of the gears cut thereby.

To these and other ends the invention resides in certain improvements and combinations of parts, all as will be hereinafter more fully described, the novel features being pointed out in the claims at the end of this specification.

In the drawing:

Fig. 1 is a plan or face view of a cutter constructed according to a preferred embodiment of the present invention;

Fig. 2 is an elevation or edge view of a fragment of the cutter shown in Fig. 1;

Fig. 3 is a section taken substantially on the line 3—3 of Fig. 1, and

Fig. 4 is a diagrammatic view of the cutting blades of the preferred form of cutter, in their relation to each other and to a tooth space of the gear being cut.

The same reference numerals throughout the several views indicate the same parts.

The preferred form of the present gear cutter, when used according to the preferred method of the present invention, is intended to operate upon a roughed-out gear blank in which the tooth spaces have already been roughed out to their full depth, but not to their full width or final profile, and is intended to make successive cuts on the side walls of each tooth space, each cut being of the full height of the tooth profile, until the tooth space is widened to the proper extent and the teeth are formed to the proper finished profile. According to the preferred method, using the preferred cutter, this finishing operation is all accomplished without any feeding movement of the cutter relatively to the gear, either during the finishing of any individual tooth space, or during the indexing of the gear being cut. The preferred cutter rotates constantly at a uniform rate, on an axis which remains fixed (so far as axial movement is concerned) relatively to the gear during the entire cutting operation, and has a gap of substantial size between the last cutting blade of the series and the first blade. The gear being cut, on the other hand, remains stationary while the successive cutting blades of the series pass through and complete one tooth space of the gear. Then, as the gap between the cutting blades passes the gear, the gear is indexed one or more steps to bring the next tooth space into position to be cut by the series of cutting blades. In other words, the gear being cut is moved intermittently with a step-by-step indexing motion, while the cutter rotates constantly and uniformly and without any feeding movement relatively to the gear.

Since the present method permits of cutting a non-generated gear with a tooth surface finish as good as that produced on generated gears, it is possible by use of a cutter made according to the present invention to cut one member of a pair of gears without generating roll. Hence, in the cutting of one member of the pair, a machine may be employed in which the generating movements may be eliminated and the feed movement, also. The machine for cutting the non-generated member of the pair will, therefore, be stiffer and more rigid than a generating machine and gears may be cut upon it faster than in a generating operation. Moreover, this machine will be of simpler construction and much less expensive. The cutter of the present invention may be employed also, however, in the cutting of generated gears.

The novel and improved gear cutting method of the present invention will be readily understood by those skilled in the art from what has been said above. The gear cutter of the present invention will now be described in detail, with reference to the accompanying drawing.

The cutter comprises a main body 11 in the form of a relatively thick substantially circular disk of steel or other suitable material, provided with a central aperture 12 for receiving the rotary shaft or arbor on which the cutter is mounted and to which it may be firmly and non-rotatably secured by any suitable means of known construction, not shown in detail here. Firmly mounted in fixed position on this disk are a plurality of cutting blades, any of which in general may conveniently be designated by the numeral 100, and the individual blades in sequence around the cutter, beginning with the blade which makes the first cut, may conveniently be individually designated by the numerals 101, 102, 103, etc., to and including 116.

The plurality of cutting blades, as a group, preferably stock-out and finish both sides of a single tooth space at each revolution of the cutter, thus cutting one side of one tooth and an adjacent side of an adjacent tooth at one operation. To accomplish this, some or all of the blades may have two cutting edges, for cutting both sides of the tooth space. Usually, however, it is preferred not to do this, but to have certain of the blades cut one side only of the tooth space, while the other blades cut the other side only of the tooth space. The blades may thus be said to be divided into two series, the blades of one series cutting one side only of the tooth space, and the blades of the other series cutting the other side only of the same tooth space.

If desired, the blades of each series may all be grouped consecutively together, one series as a whole following the other in a circumferential direction around the cutter head. While this arrangement is possible, it is frequently more convenient to alternate or intersperse the blades of one series with those of the other, and in the preferred form shown in the drawing, the blades are thus alternated. As will readily be seen from Fig. 1, those blades individually designated by odd numerals, 101, 103, 105, etc., to and including 115, constitute one series and have cutting edges at their inner forward corners, while the even numbered blades 102, 104, 106, etc., to and including 116, constitute the other series and have cutting edges at their outer forward corners.

All of the cutting blades of both series may be described as being arranged substantially on an annular line, or substantially on a circle. Each successive cutting edge of the inside-cutting or odd numbered series of blades is slightly offset radially inwardly with respect to the cutting edge of the next preceding blade of the same series. That is, the cutting edge of the blade 103 is slightly closer to the center of rotation of the cutter than the cutting edge of the preceding blade 101; the cutting edge of the blade 105 is slightly closer to the center of rotation than that of the blade 103; and so forth, the finishing cutting edge of the final or finishing blade 115 being closest of all to the center of rotation. Similarly, each successive cutting edge of the outside cutting or even numbered series of blades is slightly offset radially outwardly with respect to the cutting edge of the next preceding blade of the same series. Thus, the cutting edge of the blade 104 is slightly farther from the center of rotation of the cutter than the cutting edge of the preceding blade 102, and so on, the finishing cutting edge of the final or finishing blade 116 being farthest of all from the center of rotation. Preferably each blade is relieved behind the cutting edge so that only the cutting edges themselves come into contact with the gear being cut and there is no drag of other parts of the blade against any part of the gear blank.

With the construction above described, it is seen that as the cutter head rotates through a single revolution, to carry all of the blades successively through a single tooth space, the cutting edges of the blades will make successive cuts on both sides of the tooth space, and each cut will be of the full depth of the tooth space or the full height of the tooth profile, since the tooth spaces of the gear blank have already been roughed out to full depth but not to full width, before the cutting operation by the use of the present cutter is commenced. The successive widening of the tooth space produced by the successive blades is illustrated diagrammatically in Fig. 4, which represents a cross section through one tooth space of a gear blank G, and which shows diagrammatically, on an exaggerated scale, the positions relatively to this tooth space of the cutting edges of the various blades. The respective cutting edges are designated in this figure by the same reference numerals applied to the respective corresponding blades in Fig. 1.

The blades 101 to 114, inclusive, may be referred to conveniently as stocking-out blades, while the blades 115 and 116 may be called finishing blades. Preferably each of the stocking-out blades makes substantially the same depth or thickness of cut; that is, the radial offset differential of each blade relatively to the preceding blade of the same series is substantially the same. Thus all of the stocking-out blades do approximately the same amount of work, and all wear approximately equally. Preferably each of the finishing blades makes a thinner or shallower cut than the stocking-out blades, so that the finishing blades do less work than and remain sharper than the stocking-out blades, with the result that even when the stocking-out blades have become somewhat dulled, the finishing blades, being still sharp, will make accurate and true finishing cuts, thus producing gear teeth of great accuracy and smoothness.

As an aid in making finishing cuts of the greatest possible accuracy, it is desirable that while a cut is being made by a finishing blade, no other cut shall be made at the same time. Thus all undesirable vibration of the work and springing or displacement of the parts are avoided so far as possible. To this end, the finishing blade 115 is spaced from the last stocking-out blade 114 by a space slightly greater than the width of the face of the gear to be cut, and the second finishing blade 116 is spaced from the first finishing blade 115 by a similar space. Thus the blade 114 will have left the tooth space being cut before the blade 115 enters this tooth space, and while the blade 115 is making its finishing cut, no other blade will be in contact with the work. Likewise the blade 115 will have left the tooth space before the blade 116 enters, so that while the blade 116 is cutting, it will be the only blade in contact with the work. The stocking-out blades may, however, be relatively close to each other, for economy of space, and two or more of these blades may, without detriment, be making cuts on the work at the same time.

Between the last blade 116 and the first blade 101 is a free space of substantial size, larger than the space between the blades 115 and 116, and materially larger than the width of the face of the gear being cut. While this large space is passing the gear, during the continuous uniform rotation of the cutter head, there is ample time for the gear to be indexed one step, so that the cutting blade 101 will enter the next tooth space from the one which the blade 116 has just left. If desired, the cutter head disk 11 may be partially cut away or recessed in this space between the blades 116 and 101, to provide ample space so that the finished gear may be removed from the work arbor and a fresh gear blank may be placed thereon, without the necessity of withdrawing the work arbor or the cutter arbor relatively to each other. During this chucking and de-chucking operation, the rotation of the cutter head will, of course, be stopped, and the cutter will be in stationary position with the large gap between the blades 116 and 101 located opposite the face of the gear.

The radial offsetting of the cutting edges of the several blades relatively to each other may be accomplished in a variety of ways. For example, all of the blades of one series may be set at uniform radial distances on the cutter head, and the blades themselves may be of different shapes and dimensions in order to produce the desired offsetting of the cutting edges. Or, all the blades of one series may be of substantially identical shape and dimensions, and they may be set at different radial distances from the axis of rotation of the cutter head. In this latter event, the different radial distances may be obtained either by providing, on the cutter head, blade receiving seats at different distances from the axis of rotation, or by providing blade receiving seats all at the same radial distance from the axis of rotation, and by interposing one or more spacing members between each seat and its associated blade, so that the different blades are differently spaced. This last mentioned arrangement is the one which is ordinarily preferred and is illustrated in the drawing.

The cutter head disk 11 is provided with the required number of blade seats or surfaces 15, all of which are preferably at the same radial distance from the center of rotation. Each surface or blade seat 15 is preferably slightly inclined to the axis of rotation, as best seen in Fig. 3. One or more spacing members are provided between the seat 15 and the associated blade 100, as shown in Fig. 3, which blade 100 represents any one of the stocking-out blades. These interposed spacing members preferably include a wedge shaped member 16 having its inner surface inclined to correspond to the inclination of the seat surface 15, and its outer surface in a plane parallel to the axis of rotation of the cutter head, and include also a block 17 having its inner and outer surfaces parallel to each other, which block may conveniently be called a parallel or shim. The main body portion of the cutting blade 100 has a flat inner surface which lies flat against the outer surface of the block 17, and a cap screw 18, passing through appropriate holes in the blade 100 and member 17 and through a vertical slot in the wedge 16, is threaded radially into the cutter disk 11 and presses the cutting blade 100 tightly inwardly against the members 17 and 16, holding the latter tightly against the seat 15.

The vertical slot in the wedge 16 permits the wedge to be raised or lowered slightly notwithstanding the passage of the cap screw 18 through this wedge, in order to adjust the cutting edge of the blade 100 slightly inwardly or outwardly, as required. A screw 19 has a wide head which engages in a notch or recess in one surface of the wedge 16, and holds this wedge tight in its intended position once it has been adjusted. Turning the screw raises or lowers the wedge, so that a convenient manner of adjusting the wedge in either direction is thus provided.

Between each two seat surfaces 15, the disk 11 projects radially outwardly approximately to the outer edges of the main body portions of the blades 100. In other words, the blades are received in approximately radial slots in the disk 11, the inner edge of each radial slot being the seat surface 15, and the parallel side edges of each slot being arranged to embrace firmly the front and back edges of the respective cutting blades to hold these blades properly in upright position and prevent any tilting thereof. Each blade may have, preferably adjacent its rear edge, a shoulder 21 (Fig. 2) which contacts with the top surface of the disk 11 when the blades are seated in proper position, to determine the extent to which the blades project from the face of the disk 11. As previously explained, and as readily seen from Fig. 2, all of the blades project to the same extent, or are of the same height, since all of the blades cut fully to the bottom of the tooth space of the gear being cut, except that it may be desirable at times to make the finishing blades 115 and 116 a few thousandths of an inch (say 0.004 inch, for example) shorter than the stocking-out blades, to avoid all bottom cutting by the finishing blades and to confine their cutting action entirely to the sides of the tooth space. Even when the finishing blades are made in this manner, they still may be said to cut the full effective height of the tooth profile, since the only parts not cut by the finishing blades are the extreme bottom corners of the tooth space, and these bottom corners are ineffective and do not come into contact with the teeth of the other gear or pinion meshing with the gear which is cut by the present cutter.

Blocks 17 of different thicknesses may be employed for the different cutting blades, in order to space or offset the cutting edges of the blades different distances from the axis of rotation of the cutter, if desired, but it is preferred to obtain the offsetting or differential spacing of the blades by using wedges 16 of different thickness, rather than by using members 17 of different thickness. The members 17 for the outside-cutting series of blades are preferably all of one thickness, while the members 17 for the inside-cutting series of blades are all of the same thickness, which thickness may be different from that of the members for the other series of blades. Thus only two thicknesses of blocks 17 are required for each cutter for cutting any given width of tooth space. If it is desired to adapt the cutter to a different width of tooth space, this may easily be done by substituting a different set of blocks or shims 17, without disturbing the wedges 16.

The above described arrangement for holding the cutting blades may be used for the finishing blades 115 and 116 as well as for the stocking-out blades 101 to 114, inclusive, if desired. Usually it is preferred, however, to eliminate the screws 19 in connection with the finishing blades 115 and 116, and to hold the wedges 16 of these blades in place by fixed and immovable means, so that once the finishing blades have been set to proper position, they can not accidentally become misplaced even to a slight extent. Hence, the wedges 16 of these finishing blades 115 and 116 do not have screws 19, but are provided with pins 25 extending snugly into the wedges and into radial holes in the disk 11, above or below the screws 18. It is apparent that these pins 25 prevent any lengthwise movement of the wedges 16, such as might occur if a screw 19 became loosened, and thus the wedges of the finishing blades, once they have been properly set, can not get out of alinement.

Since all of the blades cut the full effective height of the tooth profile, only a few cuts are necessary on each side of the tooth space in order to finish the tooth space to proper final form. Thus the number of blades may be considerably reduced below the number required when each blade cuts only a portion of the full height of the tooth profile. With this reduction in the number of blades, greater space is available on the cutter head for each blade, and each blade may, therefore, be made longer in a circumferential direction than would be the case if a greater number of blades were used, thus producing a stronger and more stable form of blade, and one which may be resharpened or reground a greater number of times. Preferably the part of each blade which extends into the tooth space is curved in a direction circumferentially of the cutter head, as plainly indicated in the drawing, in order to give the blade maximum size and strength consistent with adequate clearance.

With the blades of the form shown, the cutting edge of each blade being straight and of the full effective height of the blade, the grinding operations necessary for sharpening the blades are relatively simple and the grinding of lands, ledges, and fancy or special shapes is entirely eliminated. Thus the time and expense of manufacture and maintenance of the present cutter are greatly lowered in comparison with many previous forms of cutter. The results achieved by this cutter, both in quality of work and in speed of production, are also very greatly improved over those attained by the best available previous cutters for cutting the same kind of gears. The present cutter stays sharper longer, and is able to cut gears much faster, than previous comparable cutters.

Among the reasons which probably account for the faster cutting ability of the present cutter, are the facts that all of the cuts are of the full height of the tooth profile instead of being only part of the height thereof, that the feeding movement of the cutter during the cutting of each tooth space is eliminated, that withdrawal and feeding of the cutter for purposes of indexing the gear blank is also eliminated, and that the general stiffening-up of the gear cutting machine, by reason of the elimination of unnecessary movements, permits the cutter arbor to rotate more rapidly without undesirable vibration than would be possible with sufficient accuracy of cutting if the machine had to be made less rigid or stiff.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

We claim:

1. A gear cutter for cutting gears in an intermittent indexing operation comprising a rotary head having a plurality of cutting blades of substantially uniform height projecting from one face of the head substantially parallel with the rotary axis thereof and in a generally circular path around said axis, with an indexing gap between the last and the first of said blades, successive blades having side cutting edges alternately and progressively offset in a radial direction toward and from the tool axis for cutting the opposite sides of a tooth space.

2. A gear cutter for stocking-out and finishing the teeth of longitudinally curved tooth gears, said cutter comprising a rotary head having a generally annularly arranged series of cutting blades thereon, each blade having a cutting edge for making a cut throughout the entire height of a tooth of the gear being cut, the cutting edges of successive cutting blades of said series being successively slightly offset relatively to each other in a direction radially of said cutter head so that as said head rotates through one revolution, the cutting edges of successive blades of said series will cut successive slices of stock from one side of one tooth of the gear being cut.

3. A gear cutter for stocking-out and finishing the teeth of longitudinally curved tooth gears, said cutter comprising a rotary head having a generally annularly arranged series of cutting blades thereon, a second similarly arranged series of cutting blades thereon, each blade of each series having a cutting edge for making a cut throughout the entire height of a tooth of the gear being cut, the cutting edges of successive blades of one series being successively slightly offset radially outwardly relatively to each other and the cutting edges of successive blades of the other series being successively slightly offset radially inwardly relatively to each other, so that as said head rotates through one revolution, the cutting edges of successive blades of one series will cut successive slices of stock from one side of a tooth space of the gear being cut and the cutting edges of successive blades of the other series will cut successive slices of stock from the opposite side of the same tooth space of the gear being cut, all of said slices being of the full height of the tooth profile being cut.

4. A gear cutter for stocking-out and finishing the teeth of longitudinally curved tooth gears, said cutter comprising a rotary head having a generally annularly arranged series of cutting blades thereon, a second similarly arranged series of cutting blades thereon, the blades of the two series alternating with each other approximately in a single annular row, each blade of each series having a cutting edge for making a cut throughout the entire height of a tooth of the gear being cut, the cutting edges of successive blades of one series being successively slightly offset radially outwardly relatively to each other and the cutting edges of successive blades of the other series being successively slightly offset radially inwardly relatively to each other, so that as said head rotates through one revolution, the cutting edges of successive blades of one series will cut successive slices of stock from one side of a tooth space of the gear being cut and the cutting edges of successive blades of the other series will cut successive slices of stock from the opposite side of the same tooth space of the gear being cut, all of said slices being of the full height of the tooth profile being cut.

5. A gear cutter for stocking-out and finishing the teeth of longitudinally curved tooth gears, said cutter comprising a rotary head having a generally annularly arranged series of cutting blades thereon, each blade having a cutting edge for making a cut throughout the entire height of a tooth of the gear being cut, the cutting edges of successive cutting blades of said series being successively slightly offset relatively to each other in a direction radially of said cutter head, and said blades being so placed on said head as to provide a gap of substantial circumferential extent between the end of said series of blades and the beginning thereof, so that as said head rotates the cutting edges of successive blades of said series will, during one revolution, cut successive slices of stock from one side of one tooth space of the gear being cut and the gear may be indexed while said circumferential gap is opposite the gear during the continued rotation of said cutter head, to bring the next tooth space of the gear into position to be similarly cut during the next revolution of said cutter head.

6. A gear cutter for stocking-out and finishing the teeth of longitudinally curved tooth gears, said cutter comprising a rotary head having a generally annularly arranged series of cutting blades thereon, each blade having a cutting edge for making a cut throughout the entire height of a tooth of the gear being cut, the cutting edges of successive cutting blades of said series being successively slightly offset relatively to each other in a direction radially of said cutter head, the last blade of said series being spaced from the next preceding blade of said series by a circumferential space greater than the width of the face of the gear being cut, so that as said head rotates said next to the last cutting blade of said series will leave the gear being cut before said last cutting blade of said series comes into contact with said gear being cut.

7. A gear cutter for stocking-out and finishing the teeth of longitudinally curved tooth gears, said cutter comprising a rotary head having a generally annularly arranged series of cutting blades thereon, each blade having a cutting edge for making a cut throughout the entire height of a tooth of the gear being cut, the cutting edges of successive cutting blades of said series being successively slightly offset relatively to each other in a direction radially of said cutter head, the last blade of said series being spaced from the next preceding blade of said series by a circumferential space greater than the width of the face of the gear being cut, and said blades being so placed on said head as to provide a gap of substantial circumferential extent between the end of said series of cutting blades and the beginning thereof, so that as said head rotates the cutting edges of successive blades of said series will, during one revolution, cut successive slices of stock from one side of one tooth space of the gear being cut, each slice being of the full height of the tooth profile being cut and the next to the last cutting blade of said series leaving the gear being cut before the last cutting blade of said series comes into contact with the gear being cut, and so that the gear may be indexed while said circumferential gap is opposite the gear during the continued rotation of said cutter head, to bring the next tooth space of the gear into position to be similarly cut during the next revolution of said cutter head.

8. A gear cutter for cutting gears by continuous rotation of the cutter and intermittent step-by-step indexing of the gear being cut, said cutter comprising a rotary cutter head having a plurality of cutting blades arranged annularly on said head, the blades having cutting edges all of substantially equal length and the outer ends of the cutting edges all lying substantially in a common plane perpendicular to the rotary axis of the cutter head, certain of said cutting edges lying at the outer sides of their respective cutting blades to cut one side of a tooth space of the gear being cut, certain other cutting edges lying at the inner sides of their respective cutting blades to cut the opposite side of the same tooth space of the gear being cut, successive outer cutting edges in one direction around a part of the circumference of the cutter head being successively farther from said rotary axis, and successive inner cutting edges in the same direction around a part of the circumference of the cutter head being successively closer to said rotary axis, so that as said cutter head is rotated to pass said blades successively through one tooth space of a gear being cut, the cutting edges of said blades will successively widen the tooth space and cut both sides thereof, all of the cuts being substantially the full height of the tooth profile being cut.

9. A gear cutter for cutting gears by continuous rotation of the cutter and intermittent step-by-step indexing of the gear being cut, said cutter comprising a rotary cutter head having a plurality of cutting blades arranged annularly on said head, the blades having cutting edges all of substantially equal length and the outer ends of the cutting edges all lying substantially in a common plane perpendicular to the rotary axis of the cutter head, certain of said cutting edges lying at the outer sides of their respective cutting blades to cut one side of a tooth space of the gear being cut, certain other cutting edges lying at the inner sides of their respective cutting blades to cut the opposite side of the same tooth space of the gear being cut, successive outer cutting edges in one direction around a part of the circumference of the cutter head being successively farther from said rotary axis, and successive inner cutting edges in the same direction around a part of the circumference of the cutter head being successively closer to said rotary axis, so that as said cutter head is rotated to pass said blades successively through one tooth space of a gear being cut, the cutting edges of said blades will successively widen the tooth space and cut both sides thereof, all of the cuts being substantially the full height of the tooth profile being cut, two adjacent blades being spaced from each other, at one part of the circumference of said cutter head, by a distance materially greater than the width of the face of the gear being cut, to provide an indexing gap so that the gear being cut may be indexed while said gap is in line with the gear to bring a different tooth space of the gear into position to be cut by the cutting blades during the next revolution of the cutter.

10. A gear cutter for cutting gears by continuous rotation of the cutter and intermittent step-by-step indexing of the gear being cut, said cutter comprising a rotary cutter head having an annularly arranged series of bearing surfaces, all of said surfaces being at substantially equal distances from the rotary axis of the cutter head, a series of cutting blades arranged annularly on said head, one cooperating with each of said bearing surfaces, said blades having cutting edges all of substantially equal length and the outer ends of the cutting edges all lying substantially in a common plane perpendicular to the rotary axis of the cutter head, a tapered wedge and a parallel sided block interposed between each cutting blade and its associated bearing surface, and clamping means tending to force each of said cutting blades in a generally radial direction toward its associated bearing surface, the sizes and positions of the tapered wedges and parallel sided blocks of the various blades being such that certain of said cutting edges progressively in one direction around said cutter head are located progressively farther from the rotary axis of said cutter head and certain others of said cutting edges progressively in the same direction around said cutter head are located progressively closer to the rotary axis of said cutter head.

11. A gear cutter for cutting gears in an intermittent indexing operation, having a plurality of cutting blades of substantially uniform height projecting beyond one side face of the cutter in the general direction of the axis of the cutter and arranged part-way only around the periphery of the cutter with a gap between the last and first blades to permit of indexing the work while said gap is abreast of the work in the rotation of the cutter and without relative withdrawal of the cutter from the work, said blades having inside and outside cutting edges, successive outside cutting edges being arranged at progressively increasing distances from the axis of the cutter measured in a plane perpendicular to the axis of the cutter and successive inside cutting edges being arranged at progressively decreasing distances from the axis of the cutter measured in a plane perpendicular to the axis of the cutter.

FREDERICK E. McMULLEN.
ENSIGN T. SLAYTON.